(12) United States Patent
Dvorak

(10) Patent No.: US 7,116,940 B2
(45) Date of Patent: Oct. 3, 2006

(54) EMBEDDED COMMUNICATION DEVICE WITHIN A BELT

(75) Inventor: Joseph L. Dvorak, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 10 days.

(21) Appl. No.: 10/716,262

(22) Filed: Nov. 18, 2003

(65) Prior Publication Data

US 2005/0107144 A1  May 19, 2005

(51) Int. Cl.
*H04B 7/00* (2006.01)

(52) U.S. Cl. ............... 455/66.1; 455/569.1; 455/575.1; 455/575.4; 455/575.6; 455/41.2; 379/430

(58) Field of Classification Search .......... 455/66.1, 455/569.1, 575.1, 575.4, 575.6, 575.7, 41.2; 379/430
See application file for complete search history.

(56) References Cited

U.S. PATENT DOCUMENTS

| | | | | |
|---|---|---|---|---|
| 4,157,540 A | * | 6/1979 | Oros | 340/539.11 |
| 4,300,129 A | * | 11/1981 | Cataldo | 340/539.11 |
| 4,847,818 A | * | 7/1989 | Olsen | 368/10 |
| 5,541,579 A | * | 7/1996 | Kiernan | 340/573.1 |
| 6,173,265 B1 | | 1/2001 | Takahasi | |
| 6,366,250 B1 | * | 4/2002 | McConnell | 343/718 |
| 6,507,486 B1 | | 1/2003 | Peterson, III | |
| 6,563,424 B1 | | 5/2003 | Kaario | |
| 6,580,903 B1 | | 6/2003 | Hein et al. | |
| 6,597,281 B1 | | 7/2003 | Thomas | |
| 6,619,835 B1 | | 9/2003 | Kita | |
| 6,924,742 B1 | * | 8/2005 | Mesina | 340/573.1 |
| 2002/0176586 A1 | * | 11/2002 | Leonard | 381/75 |
| 2002/0187757 A1 | * | 12/2002 | Bush | 455/90 |

FOREIGN PATENT DOCUMENTS

GB  2198898 A  * 6/1988

* cited by examiner

*Primary Examiner*—Matthew D. Anderson
*Assistant Examiner*—Minh Dao

(57) ABSTRACT

A mobile communication device (10) embedded within a public safety officer's belt (11) can include a transceiver (14) integrated within the public safety officer's belt and a buckle (18) coupled to a first end of the public safety officer's belt having at least a portion of circuitry therein to enable the transceiver upon the buckling of the buckle to a mating portion (16) on a second end of the public safety officer's belt.

20 Claims, 2 Drawing Sheets

EMBEDDED COMMUNICATION DEVICE WITHIN A BELT

CROSS-REFERENCE TO RELATED APPLICATIONS

Not applicable

FIELD OF THE INVENTION

This invention relates generally to communication devices, and more particularly to a communication system and device integrated into a belt.

BACKGROUND OF THE INVENTION

Police Officers carry a great deal of gear on their belt. Anything that would free up space on their belt would be beneficial. In addition, the radio currently can be misplaced, stolen, or lost. Embedding the radio in the officer's belt prevents this loss and ensures that the radio is always with them.

Furthermore, a radio that is off the waist of a police officer will typically be turned off in practice. Current radios and other embedded electronic devices fail to have a mechanism to ensure that the device is turned off or in a battery saving mode when not being worn. Otherwise, a device that is left on when not worn will effectively provide less battery life to the user.

SUMMARY OF THE INVENTION

In one embodiment of the present invention, a wearable communication device can include a belt having an integrated radio and a buckling mechanism having mating portions on opposing ends of the belt. The communication device can be constructed so that the integrated radio is enabled upon the buckling of the mating portions.

In a second aspect of the present invention, a mobile communication device embedded within a public safety officer's belt can include a transceiver integrated within the public safety officer's belt and a buckle coupled to a first end of the public safety officer's belt having at least a portion of circuitry therein to enable the transceiver upon the buckling of the buckle to a mating portion on a second end of the public safety officer's belt.

DETAILED DESCRIPTION OF THE DRAWINGS

Figure 2:
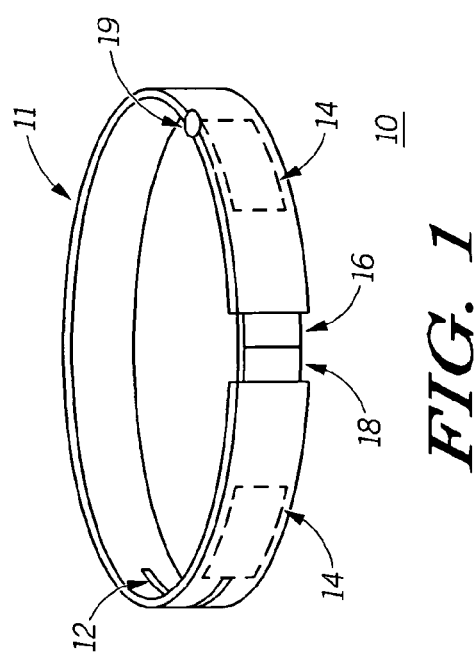
FIG. 2 is an illustration of a remote speaker microphone used in accordance with present invention.
Figure 1:
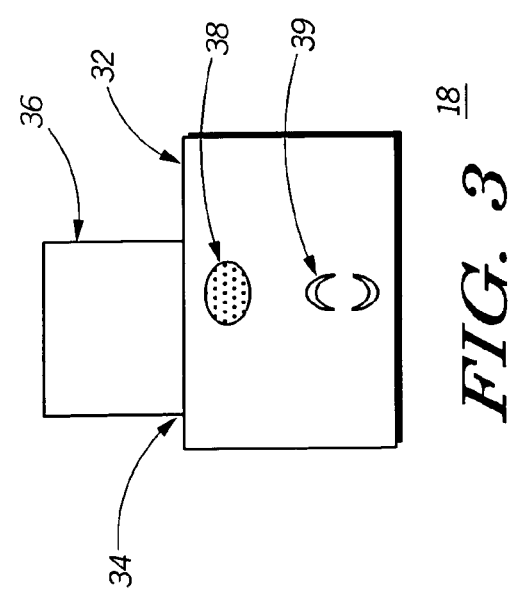
FIG. 1 is an illustration of a wearable communication device in accordance with the present invention.

Referring to FIG. 1, a block diagram of a wearable communication device 10 is shown. The device 10 can comprise, for example, a conventional cellular phone, a trunked two-way radio or dispatch radio, a public safety radio, a combination cellular phone and personal digital assistant, a smart phone, a home cordless phone, a satellite phone, a Motorola iDEN phone, a Bluetooth transceiver, a GPS receiver, or any other communication device embedded within a belt 11 in accordance with an embodiment of the present invention. In this particular embodiment, the wearable communication device 10 can include embedded portions 14 that can include portions of a communication device such as an encoder, transmitter and an antenna 12 for encoding and transmitting information as well as a receiver, decoder and the antenna 12 for receiving and decoding information sent to the wearable communication device. The receiver and transmitter would comprise a transceiver that can be coupled to the antenna 12. The embedded portions 14 as well as the antenna 12 can be arranged and constructed to take up no surface real estate on the belt 11. The belt 11 can also include a jack or other input receptacle 19 for receiving an accessory such as a remote speaker microphone 20 as shown in FIG. 2 for providing feedback on radio settings. The remote speaker microphone 20 can also include a keypad 22 for providing additional user input. The belt can also include mating or buckling portions 16 and 18 as shown in FIG. 1 that can also have embedded components. It should be understood that the embedded components on the wearable communication device 10 can be placed in either the belt 11 or in the buckle portions 16 or 18 as desired. It should also be understood that the belt 11 of the wearable communication device 10 does not necessarily need to be worn around the waist, but may also be adjusted in sized to be worn around other portions of the body such as the wrist or ankle or slung around the chest for example.

Figure 4:
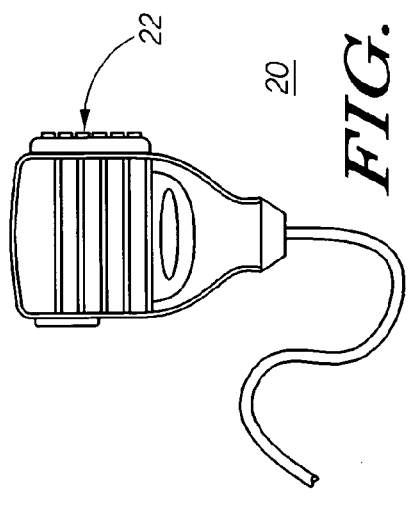
FIG. 4 illustrates a buckle portion receiving a compact flash memory card in accordance with the present invention.
Figure 3:
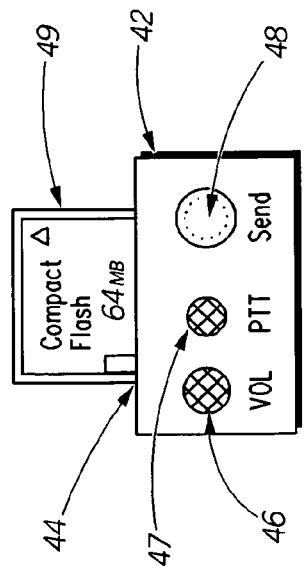
FIG. 3 illustrates a buckle portion receiving a battery in accordance with the present invention.

Referring to FIG. 3, the buckle portion 18 can include a housing 32 having a slot 34 for receiving a component 36 such as a battery, a SIMM card or any other device. The buckle portion 18 can also include a speaker 38 and a microphone 39. Likewise, referring to FIG. 4, the buckle portion 16 can include user interface devices or controls on housing 42. For example, the controls can comprise a volume control 46, a push-to-talk button 47 for a "direct-connect" or trunked radio connection and a send button 48 for making a interconnect or cellular type call. The housing 42 can also include a slot 44 for receiving a memory card 49 such as a compact flash type II card. The device 10 of FIG. 1 can further include a processor or controller (not shown) coupled to the embedded portions 14, the controls (46, 47, 48), and any other peripheral devices coupled thereto (battery 36, memory 49, accessory 20). Note that the controls, speakers, microphones, slots and other components embedded in either the buckle portions 16 or 18 or the belt 11 can be arranged in any number of ways and interpretation of the claims should not be limited to the examples illustrated herein.

Ergonomically, the wearable communication device can embed the circuitry of a police 2 way radio or iDEN radio into the belt 11 and distribute the required components around its perimeter to maximize conformability. Additionally, the wearable communication device 10 can have a mechanism and be otherwise programmed to turn the radio or transceiver on when the belt is buckled. The antenna 12 can run along the belt perimeter and can be embedded within it. Note that the device can include more than one antenna and is not necessarily limited to the configuration shown. The device 10 can also be arranged and constructed to allow the components of the radio and the battery to be removed from the belt for replacement or maintenance as necessary. Ideally, the device 10 can also include a radio power source that can be recharged while remaining in the belt. Possibly, an induction charging arrangement as known in the field of portable electrical devices can be used. For example, portable motorized toothbrushes typically contain a rechargeable battery which is charged by induction.

Figure 5:
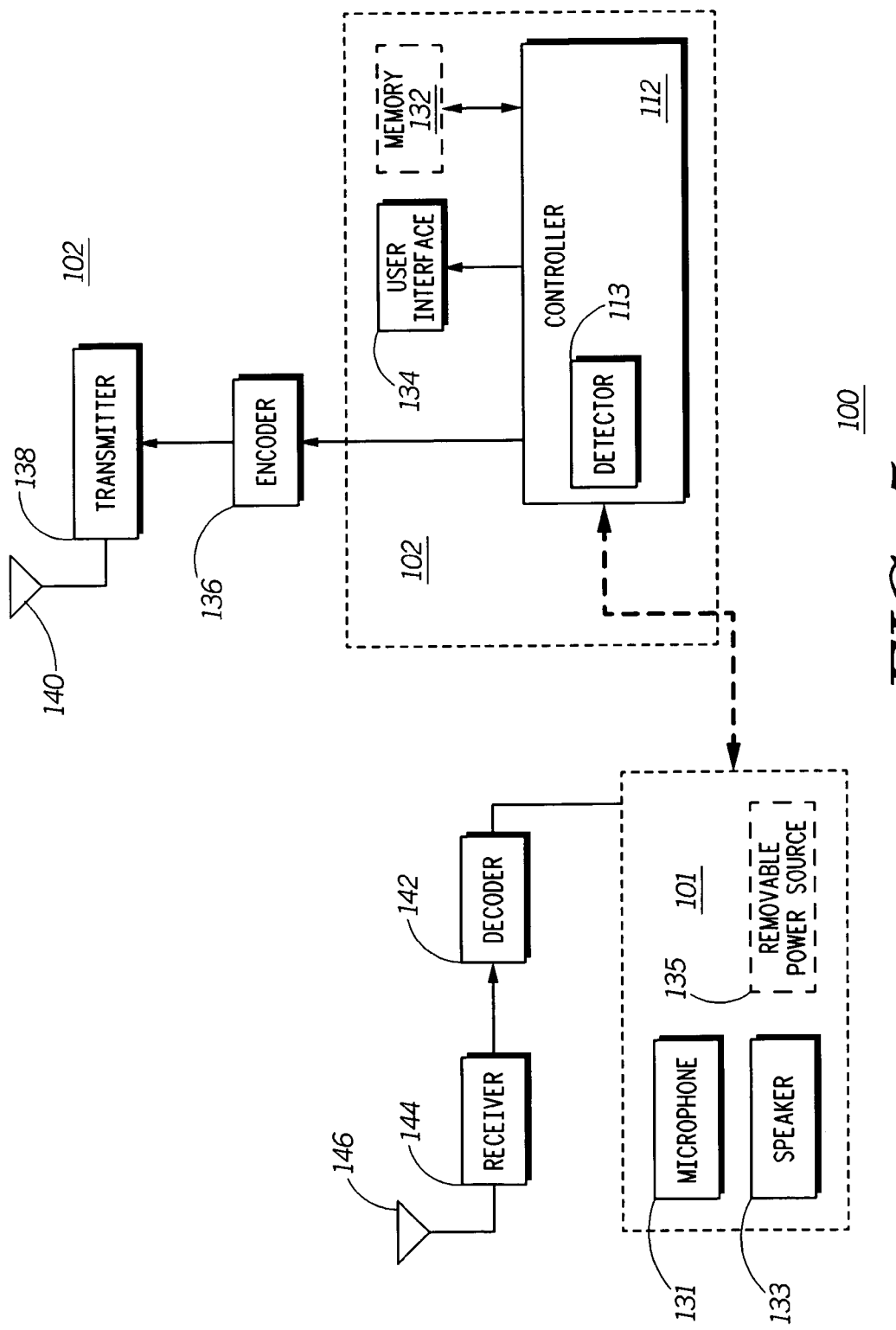
FIG. 5 is a block diagram of a wearable communication device in accordance with the present invention.

Referring to FIG. 5, a block diagram of a wearable communication device 100 is shown. As previously noted, the device 100 can comprise, for example, a conventional cellular phone, a trunked two-way radio, a smart phone, a home cordless phone, a satellite phone, a Motorola iDEN phone, or any other type of communication device in accordance with the present invention. In this particular embodiment, the wearable communication device 100 can be divided into several portions. A first portion can be imbedded in one part of a belt and can include an encoder 136, transmitter 138 and antenna 140 for encoding and transmitting information while another portion of the device 100 can include an antenna 146, receiver 144 and decoder 142 for receiving and decoding information sent to the wearable communication device 100. The receiver 144 and transmitter 138 in combination would comprise a transceiver. The device 100 can further include yet another portion 102 that can form a part of a first buckle portion having a user interface 134 and a memory 132. The portion 102 can further include a processor or controller 112 coupled to the encoder 136, the decoder 142, the user interface 134 and the memory 132. The memory 132 can be removable and can include address memory, message memory, memory for keys for use in authentication/authorization and other services and memory for database information. The device 100 can also include another portion 101 that can form a part of another buckle portion that mates with the first buckle portion. The portion 101 can include a microphone 131, a speaker 133, and a power source 135 such as a removable battery. When portion 101 mates with portion 102 (for example, a first buckle portion mating with another buckle portion), a detector 113 (which can be part of the controller 112) can detect the presence or connection between the two portions. The detection scheme can use any number of properties to detect an appropriate connection or coupling. For example, the detector 113 can simply use a voltage or current level or a sufficient magnetic coupling to enable the functionality of the transceiver. Finally, it should be understood that the components apportioned to portions 101 and 102 as shown are merely exemplary and are not limited to such arrangement. For example, the controller does not necessarily need to be included within the portion 102.

The arrangement described above allows a police officer to utilize all of the voice functionality of existing radios without taking up any room on the officer's belt, thereby freeing the space for other equipment or significantly reducing the clutter on the belt.

In light of the foregoing description, it should be recognized that embodiments in accordance with the present invention can be realized in hardware, software, or a combination of hardware and software. A method and system for secure communications in a communication device according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the methods described herein, is suited. A typical combination of hardware and software could be a general purpose computer system with a computer program that, when being loaded and executed, controls the computer system such that it carries out the methods described herein.

Additionally, the description above is intended by way of example only and is not intended to limit the present invention in any way, except as set forth in the following claims.

What is claimed is:

1. A wearable communication device, comprising:
   a belt having an integrated radio; and
   a buckling mechanism having mating portions on opposing ends of the belt, wherein the integrated radio is enabled for transmission and receipt of at least voice communication signals from an external source exclusively upon the buckling of the mating portions.

2. The wearable communication device of claim 1, wherein the integrated radio is selected from the group of devices comprising a public safety radio, an iDEN transceiver, a dispatch radio, a trunked two-way radio, a Bluetooth transceiver, a GPS receiver, a satellite phone, a cellular phone, and a cordless phone.

3. The wearable communication device of claim 1, wherein the device further comprises an embedded antenna coupled to the integrated radio.

4. The wearable communication device of claim 1, wherein the device further comprises a remote speaker/microphone input jack.

5. The wearable communication device of claim 1, wherein the buckling mechanism further comprises a user interface control or a memory card slot.

6. The wearable communication device of claim 5, wherein the buckling mechanism comprises the memory card slot for receiving a compact flash card.

7. The wearable communication device of claim 5, wherein the user interface control comprises a volume control, a push-to-talk button, a speaker, or a microphone.

8. The wearable communication device of claim 5, wherein the device further comprises a plurality of removable modules comprising radio components or a battery.

9. The wearable communication device of claim 1, wherein the belt can be worn around a waist, wrist, or ankle or slung across the chest.

10. The wearable communication device of claim 1, wherein the integrated radio remains in an off mode or a battery saving mode when the buckling mechanism is unbuckled.

11. A mobile communication device embedded within a public safety officer's belt, comprising:
    a transceiver integrated within the public safety officer's belt; and
    a buckle coupled to a first end of the public safety officer's belt having at least a portion of circuitry therein to enable the transceiver for transmission and receipt of at least voice communication signals from an external source exclusively upon the buckling of the buckle to a mating portion on a second end of the public safety officer's belt.

12. The mobile communication device of claim 11, wherein the transceiver is selected from the group of devices comprising a public safety radio, an iDEN transceiver, a dispatch radio, a trunked two-way radio, a Bluetooth transceiver, a cellular phone, a satellite phone, and a cordless phone.

13. The mobile communication device of claim 11, wherein the device further comprises an embedded antenna coupled to the transceiver.

14. The mobile communication device of claim 11, wherein the device further comprises a remote speaker/microphone input Jack.

15. The mobile communication device of claim 11, wherein the buckle further comprises a user interface control or a memory card slot.

16. The mobile communication device of claim 15, wherein the buckle comprises the memory card slot for receiving a compact flash card.

17. The mobile communication device of claim 15, wherein the user interface control comprises a volume control, a push-to-talk button, a speaker, or a microphone.

18. The mobile communication device of claim 15, wherein the device further comprises a plurality of removable modules comprising radio components or a battery.

19. The mobile communication device of claim 11, wherein the belt can be worn around a waist, wrist, or ankle or slung across the chest.

20. The mobile communication device of claim 11, wherein the transceiver remains in an off mode or a battery saving mode when the buckle is unbuckled.

\* \* \* \* \*